Feb. 25, 1936.  W. C. WEBER  2,032,075
SHEARING MECHANISM
Filed April 28, 1933  2 Sheets-Sheet 1
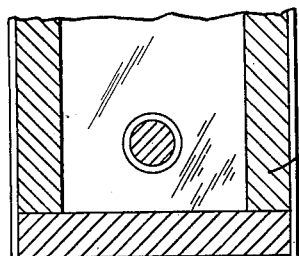
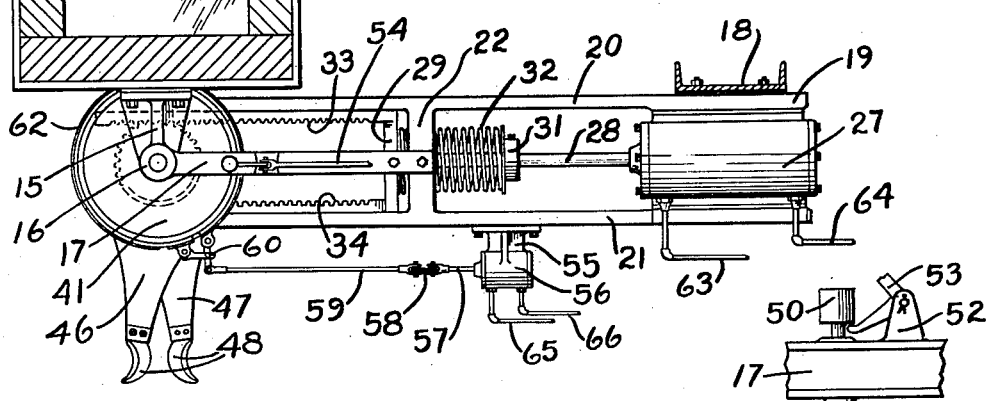
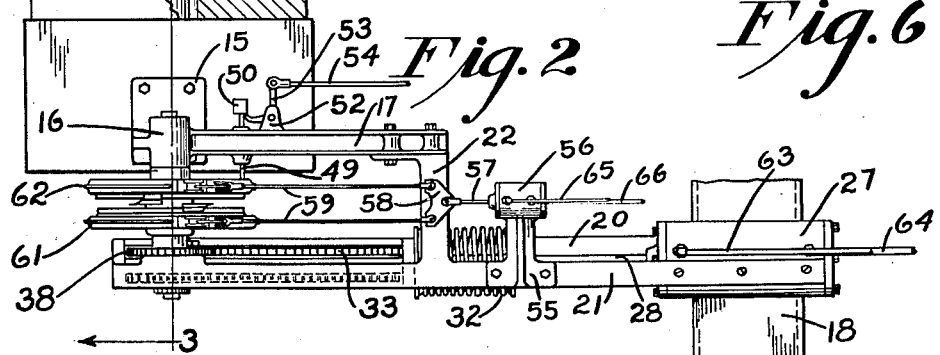
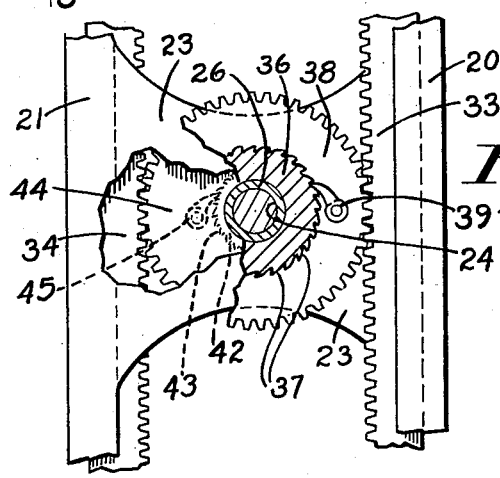
INVENTOR.
WALTER C. WEBER
BY Dorsey & Coll
ATTORNEYS.

Feb. 25, 1936. W. C. WEBER 2,032,075
SHEARING MECHANISM
Filed April 28, 1933 2 Sheets-Sheet 2
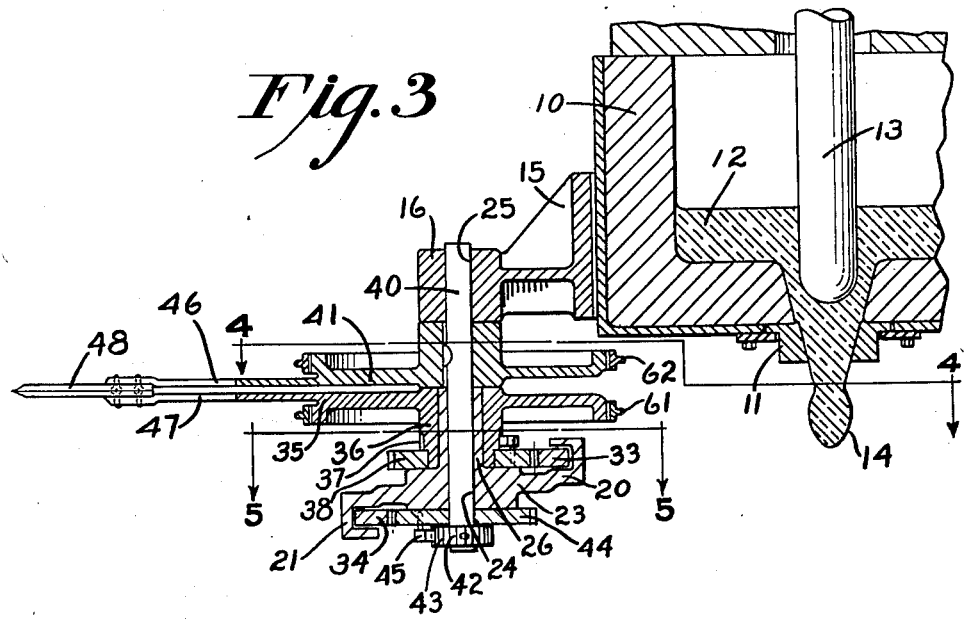
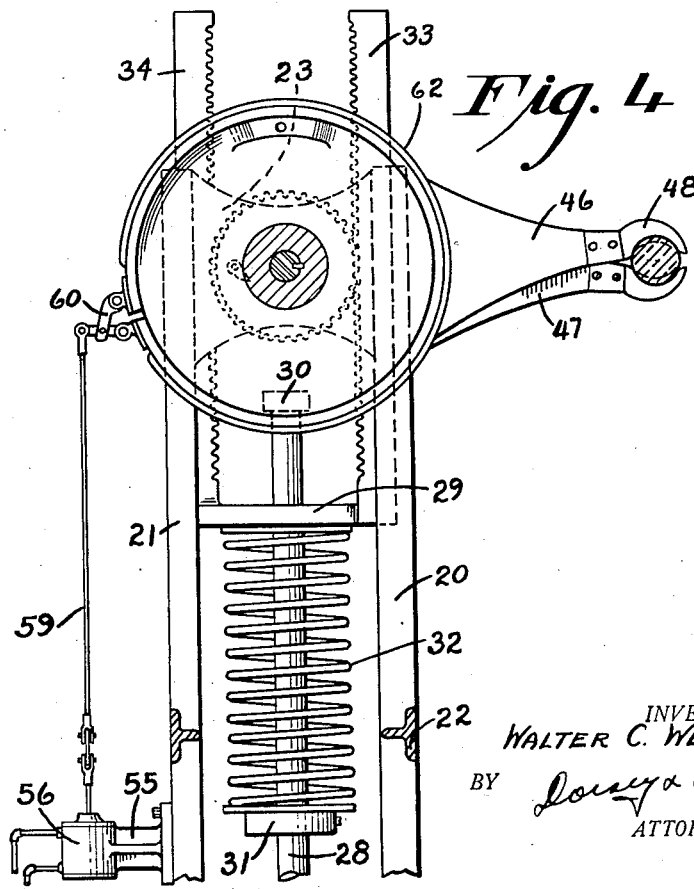
INVENTOR.
WALTER C. WEBER
BY Dorsey & Cole
ATTORNEYS.

Patented Feb. 25, 1936

2,032,075

UNITED STATES PATENT OFFICE 2,032,075

SHEARING MECHANISM

Walter C. Weber, Corning, N. Y., assignor to Corning Glass Works, Corning, N. Y., a corporation of New York Application April 28, 1933, Serial No. 668,423

1 Claim. (Cl. 49—14)

This invention relates to improvements in a shearing mechanism and more particularly to a device for shearing a stream of molten glass into gobs or mold charges.

Shearing devices of many kinds and types have been employed in the manufacture of glassware and among such devices are reciprocating shears such as those disclosed in United States Patent No. 1,629,409, issued May 17, 1927 to K. E. Peiler and rotary shears such as those disclosed in United States Patent No. 805,067, granted November 21, 1905, to H. K. Hitchcock. The shearing mechanisms now in common use frequently cause what are known in the art as shear marks in the finished glass and in many cases these shear marks become so pronounced that a glass article which is perfect in every other respect must be discarded. Many schemes have been resorted to in order to overcome this objection, and some of them have met with more or less success.

Observation leads me to believe that the shear marks are caused by a relatively long dwell of the shears within the glass. For instance, the blades of reciprocating shears advance, affect their cutting action, come to rest and then are retracted. Throughout the cutting operation the shear blades are in contact with the glass and are absorbing heat therefrom and likewise when they come to rest they are still in contact with the glass so they are absorbing heat and forming a chilled skin on the glass through contact therewith. During their retracting movement the blades are still close enough to the glass to further chill it and build up a thicker chilled skin on the sheared surface. Such chilling of the surface of the cut results in the formation of a relatively large mark or scar in the finished ware as it is impossible to affect a reheating of the cut surface in an efficient and practicable manner. When rotary shears are used the time of contact of the shear blades with the glass is somewhat reduced but it is my belief that by increasing the speed of motion of the shear blade, the glass may be cut so rapidly that no shear mark will be apparent in the finished ware.

The object of the present invention is to sever a mold charge from a stream of molten glass without producing a perceptible shear mark in the finished ware.

The above and other objects may be accomplished by employing my invention which embodies among its features moving a shear blade through a stream of molten glass with such rapidity that the heat absorbed from the glass by the shear blade is not sufficient to form a chilled skin on the glass. Other features embody a shear blade driving means which operates independently of the speed of operation of the feeder and feeder controlled means for releasing the blade driving means at predetermined intervals.

In the drawings:

Fig. 1 is a fragmentary horizontal sectional view through a forehearth showing my improved shearing mechanism attached thereto;

Fig. 2 is an end view of Fig. 1;

Fig. 3 is an enlarged sectional view taken on the line 3—3 of Fig. 2;

Fig. 4 is an enlarged sectional view taken on the line 4—4 of Fig. 3;

Fig. 5 is an enlarged fragmentary sectional view taken on the line 5—5 of Fig. 3; and Fig. 6 is a greatly enlarged fragmentary sectional view of one of the drums and its latching mechanisms.

Referring to the drawings in detail a forehearth 10 is provided with the usual outlet orifice 11 through which molten glass from a parent body 12 is extruded by a reciprocating needle 13 in the form of a gob 14 of a predetermined size and weight. The movements of the needle 13 are controlled by means of any suitable needle operating mechanism such for instance as that illustrated in the Peiler patent previously referred to.

Supported on the forehearth 10 is a bracket 15 which is formed at its outer end with a hub 16 from one side of which projects a horizontally disposed arm 17 (Fig. 2). Mounted on a suitable standard 18 to one side of the forehearth is a frame 19 and projecting from the frame toward the forehearth are spaced parallel guide bars 20 and 21 one of which is slightly above the horizontal plane of the other. Joining the guide bars intermediate their ends is an inverted U-shaped yoke 22 the bight portion of which is secured to the end of the arm 17 opposite the hub 16 and thus serves as a support for the ends of the guide bars opposite those supported by the frame 19. Connecting the guide bars 20 directly beneath the hub 16 is a web 23 which is provided with an opening 24 which aligns with an opening 25 formed in the hub 16 and extending upwardly from the web is a cylindrical boss 26 for a purpose to be more fully hereinafter described.

Secured to the frame 19 is a power cylinder 27 through one end of which a piston rod 28 operates. This piston rod extends longitudinally midway between the guide bars 21 and 20 and through an opening in a cross head 29 which is slidably mounted in the guide bars. The end of the piston rod terminates in a head 30 and adjustably secured to the piston rod on the opposite side of the cross head is a collar 31. Surrounding the piston rod between the cross head 29 and the collar 31 is a compression coiled spring 32 for a purpose to be more fully hereinafter described. Secured to the cross head 29 and extending in the general direction of the hub 16 are rack bars 33 and 34 which slide in guide bars 20 and 21, respectively. Mounted for rotation on the boss 26 is a drum 35 (Fig. 3) having a downwardly extending hub 36 which is provided near its lower with ratchet teeth 37. A downwardly projecting cylindrical portion is formed on the hub below the ratchet teeth 37 and forms a bearing upon which a pinion 38 (Figs. 3 and 5) is free to rotate. This pinion meshes with the rack bar 33 so that as the cross head 29 reciprocates the pinion 38 will be driven. Secured to the upper face of the pinion 38 is a spring pressed pawl 39 which is adapted to engage the teeth 37 and rotate the drum 35 when the rack bar 33 advances.

Extending through the openings 24 and 25 (Fig. 3) in the web 23 and hub 16 respectively, is a shaft 40 and keyed to the shaft between the drum 35 and the hub 16 is a drum 41. The lower end of the shaft 40 extends below the lower face of the web 23 and is provided with a collar 42 which is provided with ratchet teeth 43 (Figs. 3 and 5). Mounted for rotation about the shaft between the lower end of the web 23 and the collar 42 is a pinion 44 which meshes with the rack bar 34 and carries a spring pressed pawl 45 which when the rack bar 34 moves forwardly engages the teeth 43 and imparts rotary motion to the shaft 40, thus rotating the drum 41.

Carried by the drums 35 and 41, respectively, are arms 46 and 47 to the outer ends of which shear blades 48 are attached. The arms and shear blades are of such length that the blades will pass each other directly below the orifice 11 during the shearing stroke as may be readily seen in Fig. 4.

Slidable vertically through an opening in the arm 17 is a latch pin 49 carrying at its upper end a head 50 which serves as a weight to urge the lower end of the pin into engagement with the walls of an opening 51 formed in the upper drum 41 (Fig. 6). This latch pin serves to stop the rotation of the drums after the shear blades 48 have completed their cutting stroke and to retain them in the position shown in Fig. 1, until the cutting operation is to be repeated. Mounted for pivotal movement on a bracket 52 carried by the arm 17 is a bell crank lever 53, one arm of which is disposed below the head 50 of the latch pin 49 while the opposite arm is connected to a trip rod 54 (Figs. 1 and 2) by means of which the bell crank is rocked to lift the latch pin and release the drums.

Mounted on the guide bar 21 intermediate its ends is a bracket 55 which carries at its upper end a power cylinder 56 through one end of which a piston rod 57 is operable. Attached to the outer end of this piston rod is a yoke 58 to the opposite ends of which brake rods 59 are attached. The ends of the brake rods opposite those which are connected to the yoke 58 are secured to brake band operating links 60 by means of which brake bands 61 and 62 which surround the drums 35 and 41, respectively, may be tightened about their respective drums.

In order to control the movements of the piston rod 28 air from a suitable source of pressure supply (not shown) is admitted through pipe 63 or 64 as the case may be and by means of a suitable valve arrangement (not shown) these pipes may be made to serve as exhaust lines to relieve back pressure when the piston rod is moving in one or the other direction. Similar pipes 65 and 66 connect the cylinder 56 with the source of pressure supply and may serve also as exhaust lines in the same manner as pipes 63 and 64. While I have described air pressure as the source of motive power for operating the piston rods 28 and 57, it is to be understood that any other suitable means of producing reciprocal motion of these rods may be employed without in any way departing from the spirit and scope of the invention.

The operation is as follows: Assuming that the device is timed to operate with a feeder of any suitable type, and that the shear blades are in their open position as shown in Fig. 1, pressure is admitted into the cylinder 27 through pipe 64, thereby forcing the rod 28 to advance against the compression of the spring 32 until its limit of travel is reached. The trip rod 54 is connected to the feeder mechanism and at the proper time pull is exerted on this rod by the feeder, so as to lift the latch pin 49 and release the drum 41. With the release of the drum, the cross head 29 will advance and move the rack bars 33 and 34 so as to cause the pinions 38 and 44 to rotate. By reason of the engagement of the pawls 39 and 45 with the teeth 37 and 43 it will be seen that the drums 35 and 41 will be rotated in opposite directions so that the shear blades 48 will pass one another directly beneath the orifice 11. Due to the fact that these blades have been driven throughout an arc of nearly 180° before they meet beneath the orifice it will be seen that they have been gathering speed and when they do pass beneath the orifice their velocity has reached a maximum so that their time of contact with the glass is minimized. Continuing on through the glass at the high speed generated, the shear blades and their respective drums are gradually brought to rest by introducing pressure into the cylinder 56 through pipe 65. This causes the piston rod 57 to be retracted, thus exerting pull on the brake rods 59 and causing the links 60 to contract the bands 61 and 62 on their respective drums. This slows down the motion of the drums so that when the opening 51 is again beneath the latch pin 49, the latter drops into the opening and locks the drums against further rotation and in position for a repetition of the operation. By reason of the pawl and ratchet mechanism associated with the drums, as soon as the cross head 29 has reached its limit of advance the pressure in the cylinder 27 may be reversed so as to retract the piston rod 28 and by reason of the engagement of the head 30 with the cross head 29, the latter will be returned to its initial position ready for a repeat operation. As soon as the cross head has been retracted to its fullest extent, the pressure in the cylinder is reversed so as to again place the spring 32 under compression. Obviously as soon as the drums 35 and 41 have come to rest and are locked by the latch pin 49, the pressure in the cylinder 56 is reversed so as to advance the piston rod 57 and expand the brake bands 61 and 62 so as to completely free the drums 35 and 41.

While in the foregoing there has been shown and described the preferred embodiment of my invention, it is to be understood that minor changes in the details of construction, combination and arrangement of parts may be resorted to without departing from the spirit and scope of my invention as claimed.

What I claim is:

In a glass shear a shear blade, a brake drum carried thereby, a shear blade driving motor in which energy is stored while the shear blade is at rest at a point beyond which it could absorb heat from a stream of molten glass, a latch for holding the shear blade in such position against the force of the driving motor, said latch being periodically released to permit the shear blade to pass through the glass stream at high speed under the influence of the driving motor and a brake band adapted to be contracted on the drum to retard the motion of the shear blade after it has passed through the glass stream.

WALTER C. WEBER.